Jan. 11, 1938.   W. L. McNAMARA   2,105,198
HEAT CONTROL MECHANISM
Filed Feb. 7, 1936

INVENTOR.
William L. McNamara
BY Norman N. Holland
his ATTORNEY.

Patented Jan. 11, 1938

2,105,198

UNITED STATES PATENT OFFICE 2,105,198

HEAT CONTROL MECHANISM

William L. McNamara, Connellsville, Pa., assignor to Capstan Glass Company, Connellsville, Pa., a corporation of Delaware Application February 7, 1936, Serial No. 62,770

11 Claims. (Cl. 277—4)

The present invention relates to heat regulating devices, and more particularly to fuel regulating devices for oil or gas burners.

In the manufacture of glassware by automatic charge feeding and fabricating machines, charges of glass flow from a feeder spout extending from a glass tank containing molten glass. Due to the unavoidable changes in temperature in the feeder spout, there is a tendency for the charges of glass delivered to vary in weight from time to time, thus affecting the weight and content of the molded article. This is very objectionable because the requirements as to weight and content of molded containers is very rigid and must be accurately maintained within prescribed limits. To compensate for temperature changes in the feeder spout and to regulate the weight of the charges, a burner or set of burners may be provided adapted to supply additional heat to increase the temperature or to supply less heat to permit the temperature to decrease. These changes in the amount of heat supplied must be regulated in very small increments to maintain a substantially uniform temperature in order to accurately control the weight of the charges. In other industries, where it is desired to control the amount of heat supplied, similar problems exist. The devices which have been utilized heretofore for regulating burners have not been entirely satisfactory.

An object of the present invention is to provide a simple inexpensive heat regulating device for varying the amount of fuel supplied to a burner or the like.

Another object of the invention is to provide a heat controlling device which may be readily adjusted a predetermined amount.

Another object of the invention is to provide a heat regulating device for changing the amount of fuel supplied in small predetermined increments.

Another object of the invention is to provide a heat regulating device which indicates the amount of fuel being supplied or the effective temperature of the burner.

Another object of the invention is to provide a heat regulating device which may be quickly adjusted without materially affecting the burner flame during the adjustment thereof.

Another object of the invention is to provide a heat regulating device which is compact in construction and substantially leak-proof so that the fuel will not be wasted.

Another object of the invention is to provide a heat regulating device for controlling the amount of air supplied with gaseous fuel to insure combustion of the fuel.

Another object of the invention is to provide a heat regulating device for simultaneously adjusting the amount of fuel supplied to a burner and the amount of air supplied with the fuel.

A further object of the invention is to provide a heat regulating device particularly adapted to be used in connection with glass feeders, or the like.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a front elevational view, partly in section, illustrating a preferred embodiment of the invention;

Figures 1, 2:
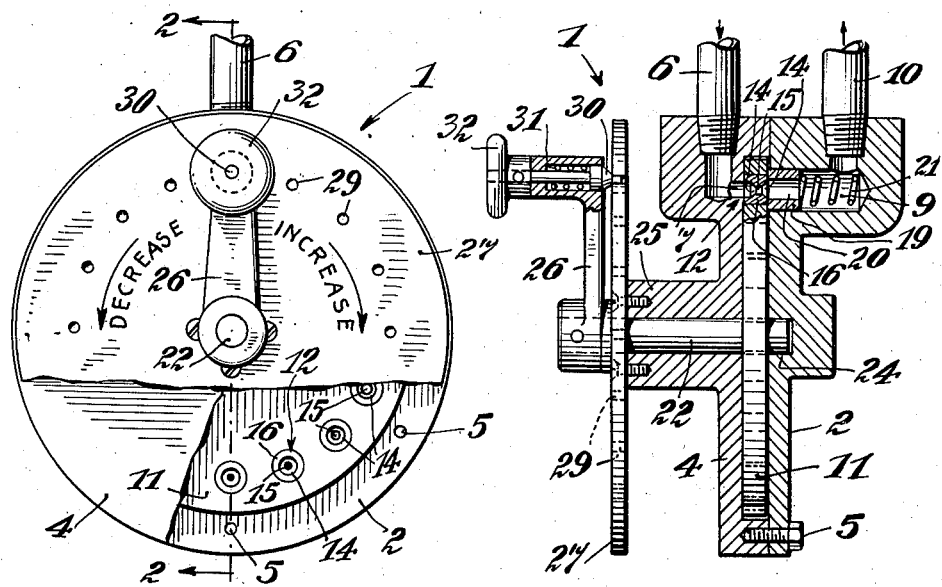
Fig. 2 is a sectional view, taken along the line 2—2 of Fig. 1.

Referring again to the drawing, and more particularly to Figs. 1 and 2 thereof, there is shown a heat regulating device 1 for controlling the amount of fuel delivered to a burner or the like. Preferably, the device comprises a casing member or plate 2 secured to another casing member 4 by any desired number of bolts 5 or other suitable means. The casing members 2 and 4 provide a suitable chamber for mounting the regulating means about to be described. The fuel may be delivered to the chamber by a suitable inlet pipe or conduit 6 and passed through a conduit 7 in the casing member 4 and then into the chamber. A conduit 9, in alignment with the conduit 7, is provided in the casing member 2 and is adapted to deliver the fuel passing through the controlling device to an outlet pipe or conduit 10 connected to the burner.

In order to control accurately the amount of fuel passing through the device and to vary the amount of fuel supplied to the burner in small increments, a disc member 11 is mounted in the chamber between the casing members 2 and 4.

The disc is provided with a series of circularly arranged apertures or orifices 12 adapted to be moved into registry one at a time with the conduits 7 and 9 so that the fuel in passing from conduit 7 to conduit 9 must pass through the orifice 12. Preferably, the respective ends of the apertures 12 are enlarged or countersunk at 14 so that they are of the same effective diameter as the diameter of the conduits 7 and 9 and are constricted at the middle thereof, as shown at 15. The constricted portions 15 vary progressively in size to control the flow of the fuel through the device. The flared or enlarged ends 14 are adapted to guide the flow of fuel to and from the constricted portions without substantially affecting the pressure of the fuel delivered to the burners or the turbulent action of the fuel in the device. If desired, suitable bushing members 16 may be secured in openings in the disc 11, wherein the apertures 12 may be formed. By utilizing the bushing members 16, the apertures can be drilled and graduated more accurately and the bushing members may be removed and replaced individually, thus also eliminating the need of replacing the entire disc should one of the apertures get out of adjustment in some way.

In order to prevent leakage between the casing members 2 and 4 and the disc 11, the conduit 9 may be enlarged and a bushing 19 having an opening 20 may be seated in the conduit 9 and held against the disc 11 by a spring member 21. The diameter of the bushing opening 20 is substantially the same as the diameter of the ends 14 of the apertures 12 and is in alignment with the conduit 7 so that any desired orifice 12 may be utilized to control the amount of fuel delivered. In this manner, the disc 11 need not be mounted too tightly in the chamber, whereby rotation thereof is facilitated, and at the same time leakage between the disc and the casing members is prevented.

Preferably, the disc 11 is rotatably mounted on a shaft 22 seated in suitable bearing portions 24 and 25 provided in the casing members 2 and 4 respectively. The shaft is provided at one end with a handle 26 adapted to be rotated to revolve the shaft and disc 11 and change the orifices 12, in registry with the conduits 7 and 9. To insure proper registry of an aperture 12 with the conduits 7 and 9 and visibly indicate which aperture is in registry, a plate 27 having circularly arranged apertures 29 therein may be attached to the casing member 4. A pin 30 is resiliently mounted on the handle by a spring 31 adapted to fit into the apertures 29 and the handle is provided with a gripping portion 32 or button adapted to be pulled outwardly in opposition to the spring 31 to remove the pin from an aperture 29 whereby the handle may be rotated to another position and the pin may be placed in another aperture. The apertures 29 may be marked in any desired manner so that the operator knows the size of the aperture which is in registry with the fuel conduits. If desired, the apertures 29 may be numbered in sequence to indicate the relative amount of fuel supplied or may be marked to indicate the approximate effective temperature of the burners. The apertures 12 and 29 preferably are arranged progressively in sequence so that rotation of the handle in one direction will decrease the amount of fuel in small increments and rotation in the other direction will increase the amount of fuel supplied in small increments.

While the controlling device has been described as a fuel regulating device, it will be understood that it may also be utilized to control the amount of air supplied to facilitate combustion of gaseous fuels. To accomplish this, a device similar to the fuel regulating device may be connected to the air line and may be operated in conjunction with the fuel device to maintain proper combustion of the fuel supplied. If desired, the air may be regulated by any other suitable valve or damper.

Figures 3, 4:
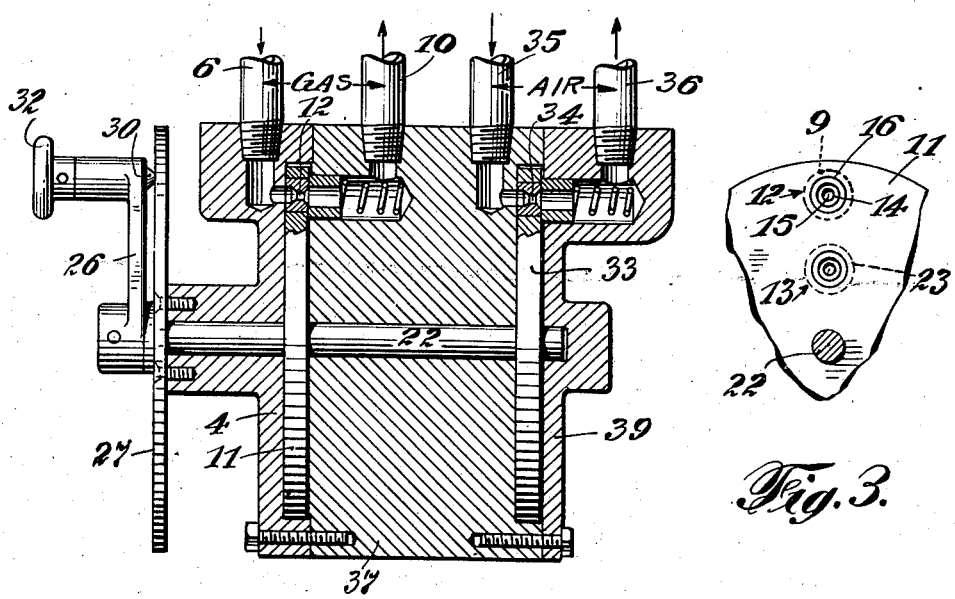
Fig. 3 is a fragmentary front elevational view illustrating a modification of the preferred embodiment.
Fig. 4 is a sectional view illustrating another embodiment of the invention.

In Fig. 3, there is shown a burner controlling device particularly adapted to be used in connection with gaseous fuel burned with air to facilitate combustion. Where gas and air are burned in this manner, it is desirable to supply the same proportion of fuel and air regardless of the amount of the mixture which is supplied, so that the fuel is properly burned and the maximum heat is derived therefrom. In order to accomplish this, a second chamber may be provided having a disc 33 therein mounted on the shaft 22. The disc 33 is provided with circularly arranged orifices or apertures 34, varying in size, adapted to regulate the amount of air delivered from an inlet conduit 35 and delivered to an outlet conduit 36 in communication with the burners. The disc 33 and the apertures 34 therein are substantially like the disc 11 and the apertures 12 for regulating the fuel and a detailed description thereof will not be necessary.

The casing for containing the discs 11 and 33 may be constructed in any suitable manner but preferably comprises an end member 4 having a disc receiving chamber therein, a middle member 37, and an end member 39 adapted to be secured to the middle member. The end member 4 is provided with the fuel inlet conduit 6, the middle member is provided with the fuel outlet conduit 10, and the air inlet conduit 35, and the end member 39 is provided with the air outlet conduit 36.

The apertures 34 are positioned with respect to the apertures 12 on the disc 11 so that any suitable predetermined mixture of air and fuel is delivered in varying amount to the burner. For example, a mixture of half gas and half air by volume may be supplied at a very low rate or may be supplied at a substantially higher rate since the size of the aperture 34 in registry is always in proportion to the aperture 12 in registry. Also, the disc may be so adjusted that the proportion of air and gas varies at a predetermined rate desired to obtain maximum combustion. After the discs 11 and 33 are adjusted on the shaft, they are rotated simultaneously and the relation of their respective apertures remains unchanged during the operation of the device. The indicating disc 27 may also be utilized to indicate the amount of the air and fuel supplied or the effective heat of the burners in the same manner as described in connection with the preferred embodiment. The handle 26 may be rotated to decrease or increase the amount of the mixture supplied.

If desired, the flow of fuel and air may be regulated by utilizing a disc having a series of circularly arranged orifices or apertures 12 substantally at the outer periphery thereof and having a second series of circularly arranged orifices 13 spaced inwardly at a suitable distance from the series at the outer periphery. Preferably, the respective apertures of each series are in radial alignment or definitely circumferentially spaced with respect to each other so that a predetermined fuel aperture is in registry with the fuel conduit, while a predetermined air aperture is in registry with the air conduit. One of such rows of apertures, for example the outer row 12, may be used to control the fuel supply and the inner row 13 may be used to regulate simultaneously the air supply. Thus, by means of a single disc having two rows of apertures therein, it is possible to supply the fuel and air in predetermined suitable proportions. Such a device would be substantially like the device illustrated in Figs. 1 and 2, except that apertures 13 would be adapted to be moved into registry with an air conduit 23 extending through the casing.

In operating the device, the burners are first adjusted to heat the glass in the feeder spout to a desired temperature and thereafter the handle 26 is adjusted on the indicating disc 27 to supply a desired amount of fuel adapted to maintain a predetermined temperature in the feeder spout. If, during the operation of the feeder, unavoidable changes in temperature occur, these may be detected by a temperature indicating device and more or less heat may be supplied by moving the handle to increase or decrease the amount of fuel. Where the construction shown in Fig. 3 is utilized, the operation thereof is substantially the same, except that the relative circumferential positions of the discs 11 and 33 may be first adjusted to determine the proportion of air and fuel. This adjustment may also be made by controlling the amount of air supplied to the air inlet conduit 35 so that proper combustion of the fuel is attained. After this adjustment is once made, the apertures 34 may be utilized to change the amount of air.

It will be seen that the present invention provides a simple, inexpensive burner controlling device adapted to accurately change the amount of fuel and/or air supplied to heating devices to accurately regulate the temperature in a feeder spout, furnace or the like. The indicating disc clearly shows the relative size of the apertures in registry with the conduits or the effective temperature of the burner and the direction in which the handle should be rotated to increase or decrease the amount of fuel supplied. The indicating disc apertures also insure proper registry of the fuel controlling aperture by locking the handle when conduits and apertures register. Where the modified device is utilized to regulate both the supply of air and fuel supplied, the mixture of air and fuel may be regulated simultaneously and proper combustion of the fuel is attained at all times. The present device is simple in its operation, does not require numerous complicated adjustments to be made, and can be easily taken apart and cleaned. The parts of the device are rugged in construction and can readily withstand any rough usage to which they may be subjected.

This application is a continuation, in part, of application Serial No. 570,833, filed October 24, 1931, now Patent No. 2,052,578, dated September 1, 1936.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a regulating device, the combination of a fuel conduit, a rotatable disc having a series of graduated apertures therein adapted to be brought into registry one at a time with said conduit to vary the amount of fuel delivered through said conduit, an air conduit, a second rotatable disc having a series of graduated apertures therein adapted to be brought into registry one at a time with said air conduit to vary the amount of air delivered through said air conduit, and means for rotating said discs simultaneously to control the amount of fuel and air supplied.

2. In a regulating device, the combination of a fuel conduit, a rotatable disc having a series of graduated apertures therein adapted to be brought into registry one at a time with said conduit to vary the amount of fuel delivered through said conduit, an air conduit, a second rotatable disc having a series of graduated apertures therein adapted to be brought into registry one at a time with said air conduit to vary the amount of air delivered through said air conduit, means for rotating said discs simultaneously to control the amount of fuel and air supplied, and devices for determining when an aperture is in registry with said fuel conduit and when an aperture is in registry with said air conduit.

3. In a regulating device, the combination of a fuel conduit, a rotatable disc having a series of graduated apertures therein adapted to be brought into registry one at a time with said conduit to vary the amount of fuel delivered through said conduit, an air conduit, a second rotatable disc having a series of graduated apertures therein adapted to be brought into registry one at a time with said air conduit to vary the amount of air delivered through said air conduit, a rotatable shaft extending through said discs and having said discs secured thereto in a position so that a predetermined fuel aperture is in registry with the fuel conduit when a predetermined air aperture is in registry with the air conduit whereby a predetermined mixture of air and fuel is supplied, means for rotating said shaft, and means for indicating the apertures in registry with their respective conduits.

4. A regulating device, comprising in combination a casing having a fuel conduit extending therethrough and having an air conduit extending therethrough, a member having a series of graduated apertures adapted to register with said fuel conduit and a second series of apertures adapted to register with said air conduit, and means for moving said member to change the position of the apertures.

5. A regulating device, comprising in combination a casing having a conduit extending therethrough and having a second conduit extending therethrough in radial alignment with said first conduit but nearer to the center of said casing, a disc member having a circumferentially extending series of graduated apertures adapted to register with said first conduit and a second series of apertures nearer to the center of the disc adapted to register with said second conduit, and means for moving said member to change the position of the apertures.

6. A regulating device, comprising in combination, a conduit, a member having a series of bushings each provided with an aperture therein adapted to be brought into registry one at a time with said conduit, both ends of each of said apertures having substantially the same size bore as said conduit, the portion adjacent to the ends being tapered to reduce the size of the aperture, and a portion intermediate said tapered portions of each of said apertures varying progressively to control the flow of fluid, and means for moving said member to select any desired aperture and to move said aperture into registry with said conduit.

7. A regulating device of the class described, comprising in combination a casing having a recess therein and a conduit adjacent said recess provided with an inlet and an outlet in alignment with said inlet, a member mounted in said recess having a series of apertures of varying size therein adapted to register with said conduit to control the amount of fluid delivered through said conduit, means for moving said member to bring any desired aperture into registry with said conduit, a bushing in said conduit having an aperture therein adapted to register with the apertures of said movable member, and a spring member in said conduit for urging said bushing against said movable member to prevent leakage of fluid.

8. A regulating device, comprising in combination, a casing having a fuel conduit and an air conduit extending therethrough, means having a series of progressively graduated apertures adapted to register with said conduits to vary the amount of fuel and air supplied through said conduits, and means for moving said first means to simultaneously change the position of the aperture in registry with each of said conduits.

9. A regulating device comprising in combination, a casing, a conduit extending through said casing, a rotatable disc member having a series of bushings each provided with an aperture therein adapted to be brought into registry one at a time with said conduit, the ends of said apertures being tapered outwardly and, at the ends of the bushing, having substantially the same size as the bore of said conduit, said apertures being circularly arranged on said disc and varying progressively to control the flow of fluid, and means for rotating said disc to select any desired aperture and to move the desired aperture into registry with said conduit.

10. A device for regulating the flow of fluids comprising the combination of a fluid conduit, a rotatable disc having a series of circularly arranged bushings therein each provided with an aperture adapted to be brought into registry one at a time with said conduit, the ends of said apertures being divergently tapered and, at the ends of the bushings, having substantially the same size as the bore of said conduit, said apertures being graduated in size to control the amount of fluid delivered through said conduit, a stationary disc having a series of circularly arranged apertures therein corresponding in number to the apertures of said first disc and said apertures in said stationary disc being substantially in alignment with an aperture of said first disc, a member adapted to rotate said first disc, and means carried by said member having a portion extending into an aperture in said second disc to lock said member against accidental movement when an aperture of said first disc is in registry with said fuel conduit.

11. A regulating device of the class described comprising the combination of a conduit, a stationary disc having a series of apertures therein, a rotatable shaft extending through said disc, a rotatable disc mounted on said shaft having a series of bushings each provided with an aperture adapted to be brought into registry one at a time with said conduit, the ends of said aperture being substantially the same size as the bore of said conduit, said apertures being progressively graduated and adapted to be brought into registry with said conduit to vary the effective diameter of said conduit to control the flow of fuel therethrough, and a handle member for rotating said shaft and said rotatable disc, said handle member having means thereon adapted to extend into one of said apertures in said stationary disc when an aperture of said rotating disc is in registry with said conduit to lock said rotatable disc against rotation.

WILLIAM L. McNAMARA.